(12) United States Patent
Rupp et al.

(10) Patent No.: US 9,037,350 B2
(45) Date of Patent: *May 19, 2015

(54) DETECTION OF AND COUNTER-MEASURES FOR JACKKNIFE ENABLING CONDITIONS DURING TRAILER BACKUP ASSIST

(71) Applicant: Ford Global Technologies, Dearborn, MI (US)

(72) Inventors: Matt Y. Rupp, Canton, MI (US); David Dean Smit, Ann Arbor, MI (US); Erick Michael Lavoie, Dearborn, MI (US); Roger Arnold Trombley, Ann Arbor, MI (US); Thomas Edward Pilutti, Ann Arbor, MI (US)

(73) Assignee: Ford Global Technologies, Dearborn, MI (US)

(*) Notice: Subject to any disclaimer, the term of this patent is extended or adjusted under 35 U.S.C. 154(b) by 36 days.

This patent is subject to a terminal disclaimer.

(21) Appl. No.: 14/052,062

(22) Filed: Oct. 11, 2013

(65) Prior Publication Data
US 2014/0046545 A1   Feb. 13, 2014

Related U.S. Application Data

(63) Continuation of application No. 13/443,743, filed on Apr. 10, 2012, now Pat. No. 8,825,328, which is a continuation-in-part of application No. 13/336,060, filed on Dec. 23, 2011, now Pat. No. 8,909,426.

(60) Provisional application No. 61/477,132, filed on Apr. 19, 2011.

(51) Int. Cl.
*B62D 13/06* (2006.01)
*B62D 15/02* (2006.01)
*G05D 1/02* (2006.01)

(52) U.S. Cl.
CPC ............. *G05D 1/0212* (2013.01); *B62D 15/02* (2013.01); *B62D 13/06* (2013.01); *B62D 15/027* (2013.01)

(58) Field of Classification Search
None
See application file for complete search history.

(56) References Cited

U.S. PATENT DOCUMENTS

| 3,944,972 A | 3/1976 | Chandler |
| 4,040,006 A | 8/1977 | Kimmel |

(Continued)

FOREIGN PATENT DOCUMENTS

| CN | 101833869 A | 9/2009 |
| DE | 3923676 A1 | 1/1991 |

(Continued)

OTHER PUBLICATIONS

Back Driving Assistant for Passenger Cars with Trailer (SAE Int'l).
(Continued)

*Primary Examiner* — James Trammell
*Assistant Examiner* — Demetra Smith-Stewart
(74) *Attorney, Agent, or Firm* — Angela M. Brunetti; Raymond Coppiellie

(57) ABSTRACT

A trailer backup control system includes a jackknife enabling condition detector and a jackknife counter-measures controller. The jackknife counter-measures controller alters a setting of at least one vehicle operating parameter for alleviating an adverse jackknife condition during backing of the trailer by the vehicle when the jackknife enabling condition detector determines that a jackknife enabling condition has been attained at a particular point in time during backing of the trailer by the vehicle, restricts a trailer backup steering input apparatus and issues a warning to the driver using the trailer backup steering input apparatus.

35 Claims, 7 Drawing Sheets

(56) References Cited

U.S. PATENT DOCUMENTS

| | | | |
|---|---|---|---|
| 4,277,804 A | 7/1981 | Robison | |
| 4,366,966 A | 1/1983 | Ratsko et al. | |
| 4,848,499 A | 7/1989 | Martinet et al. | |
| 4,897,642 A | 1/1990 | Dilullo | |
| 5,001,639 A | 3/1991 | Breen | |
| 5,142,278 A | 8/1992 | Moallemi | |
| 5,247,442 A | 9/1993 | Kendall | |
| 5,579,228 A | 11/1996 | Kimbrough | |
| 5,690,347 A | 11/1997 | Juergens | |
| 5,999,091 A | 12/1999 | Wortham | |
| 6,226,226 B1 | 5/2001 | Lill | |
| 6,268,800 B1* | 7/2001 | Howard | 340/686.1 |
| 6,292,094 B1 | 9/2001 | Deng et al. | |
| 6,494,476 B2 | 12/2002 | Masters et al. | |
| 6,498,977 B2 | 12/2002 | Wetzel et al. | |
| 6,501,376 B2 | 12/2002 | Dieckmann | |
| 6,668,225 B2 | 12/2003 | Oh | |
| 6,838,979 B2* | 1/2005 | Deng et al. | 340/431 |
| 6,847,916 B1 | 1/2005 | Ying | |
| 6,854,557 B1 | 2/2005 | Deng | |
| 6,959,970 B2 | 11/2005 | Tseng | |
| 7,142,098 B2 | 11/2006 | Lang | |
| 7,154,385 B2 | 12/2006 | Lee et al. | |
| 7,175,194 B2 | 2/2007 | Ball | |
| 7,225,891 B2 | 6/2007 | Gehring et al. | |
| 7,239,958 B2 | 7/2007 | Grougan | |
| 7,272,481 B2 | 9/2007 | Einig | |
| 7,690,737 B2 | 4/2010 | Lu | |
| 7,715,953 B2 | 5/2010 | Shepard | |
| 7,786,849 B2 | 8/2010 | Buckley | |
| 7,798,263 B2 | 9/2010 | Tandy, Jr. | |
| 7,932,623 B2 | 4/2011 | Burlak et al. | |
| 2002/0005780 A1 | 1/2002 | Ehrlich | |
| 2004/0215374 A1 | 10/2004 | Shepard | |
| 2005/0000738 A1 | 1/2005 | Gehring | |
| 2005/0073433 A1 | 4/2005 | Gunderson | |
| 2005/0206229 A1 | 9/2005 | Lu et al. | |
| 2005/0209763 A1 | 9/2005 | Offerle | |
| 2006/0103511 A1* | 5/2006 | Lee et al. | 340/431 |
| 2006/0111820 A1 | 5/2006 | Goetting | |
| 2007/0027581 A1 | 2/2007 | Bauer et al. | |
| 2007/0198190 A1 | 8/2007 | Bauer et al. | |
| 2007/0252359 A1 | 11/2007 | Wishart et al. | |
| 2008/0231701 A1 | 9/2008 | Greenwood | |
| 2008/0312792 A1 | 12/2008 | Dechamp | |
| 2009/0005932 A1 | 1/2009 | Lee | |
| 2009/0093928 A1 | 4/2009 | Getman et al. | |
| 2009/0198425 A1* | 8/2009 | Englert | 701/70 |
| 2009/0271078 A1 | 10/2009 | Dickinson | |
| 2009/0306854 A1 | 12/2009 | Dechamp | |
| 2010/0063702 A1 | 3/2010 | Sabelstram | |
| 2010/0152989 A1 | 6/2010 | Smith et al. | |
| 2010/0156667 A1 | 6/2010 | Bennie | |
| 2010/0198491 A1 | 8/2010 | Mays | |
| 2010/0222964 A1 | 9/2010 | Dechamp | |
| 2011/0001825 A1 | 1/2011 | Hahn | |
| 2011/0029210 A1 | 2/2011 | Wu | |
| 2011/0063425 A1 | 3/2011 | Tieman | |
| 2011/0129093 A1 | 6/2011 | Karam et al. | |
| 2011/0257860 A1 | 10/2011 | Getman | |
| 2012/0030626 A1 | 2/2012 | Hopkins et al. | |
| 2012/0041659 A1 | 2/2012 | Green | |
| 2012/0109471 A1 | 5/2012 | Wu et al. | |
| 2012/0185131 A1 | 7/2012 | Headley | |
| 2012/0200706 A1 | 8/2012 | Greenwood et al. | |
| 2012/0316732 A1 | 12/2012 | Auer et al. | |
| 2013/0158863 A1 | 6/2013 | Skvarce et al. | |

FOREIGN PATENT DOCUMENTS

| | | |
|---|---|---|
| DE | 3931518 A1 | 4/1991 |
| DE | 9208595 U1 | 9/1992 |
| DE | 19526702 A1 | 2/1997 |
| DE | 10065230 A1 | 7/2002 |
| DE | 10154612 A1 | 5/2003 |
| DE | 102005043467 | 3/2007 |
| DE | 102005043468 | 3/2007 |
| DE | 102006002294 | 7/2007 |
| DE | 102006035021 | 1/2008 |
| DE | 102008004160 B4 | 10/2008 |
| DE | 102007029413 | 1/2009 |
| DE | 102008043675 | 5/2010 |
| DE | 102009007990 | 8/2010 |
| DE | 102009012253 | 9/2010 |
| DE | 102008004158 B4 | 10/2011 |
| DE | 102008004159 B4 | 10/2011 |
| DE | 102010021052 A1 | 11/2011 |
| DE | 102010029184 | 11/2011 |
| EM | 2388180 A2 | 11/2011 |
| EP | 0418653 A1 | 3/1991 |
| EP | 0849144 A2 | 6/1996 |
| EP | 1810913 | 7/2007 |
| FR | 2515379 A1 | 10/1981 |
| FR | 2716146 A1 | 8/1995 |
| FR | 2786456 A1 | 6/2000 |
| GB | 2398049 A | 8/2004 |
| GB | 2398050 A | 8/2004 |
| WO | WO 8503263 A1 | 8/1985 |
| WO | WO 00/44605 A1 | 8/2000 |
| WO | WO 2005005200 A2 | 1/2005 |
| WO | WO 2005116688 A2 | 12/2005 |

OTHER PUBLICATIONS

IEEE—Backing Up a Truck-Trailer with Suboptimal Distance Trajectories.
IEEE—Control of a Robot-Trailer System Using a Single Non-Collacated Sensor.
IEEE—Control of a Car with a Trailer Using the Driver Assistance System.
IEEE—Design of a Stable Backing Up Fuzzy Control.
IEEE—Feedback Control Scheme for Reversing a Truck and Trailer Vehicle.
IEEE—Effects of Sensor Placement and Errors on Path Following Control.
Experiments in Autonomous Reversing of a Tractor-Trailer System.
How to Avoid Jacknifing.
Hybrid Control of a Truck and Trailer Vehicle.
Robust Trajectory Tracking for a Reversing Tractor-Trailer System (Draft).
Optionally Unmanned Ground Systems for Any Steering-Wheel Based Vehicle.
TRID—Automatic Brake Control for Trucks—What Good is it?.
A Simple Tractor-Trailer Backing Control Law for Path Following Oct. 18, 2010.
Backing-Up Maneuvers of Autonomous Tractor-Trailer Vehicles Using the Qualitative Theory of Nonlinear Dynamical Systems Jan. 1, 2009.
Neurointerfaces;Applications 2000.
Trajectory Tracking Control of a Car-Trailer System May 1997.
A Robust Stabilization Problem of Fuzzy Conrtol Systems and Its Application to Backing Up Control of a Truck-Trailer May 1994.
Steering Assistance for Backing Up Articulated Vehicles.
An Input-Output Linearization Approach to the Control of an N-Body Articulated Vehicle Sep. 2001.
An Investigation of Abs Strategies for Articulated Vehicles 2004.
Development of Configurations for Infrastructure-Friendly Five-And Six-Axie Semitrailers 2006.
Steering and Independent Braking Control for Tractor-Semitrailer Vehicles in Automated Highway Systems Dec. 15, 1995.
Adam J. Simonoff; Remotely Piloted Vehicle Control and Interface System Aug. 1, 1995.
Wireless-Enabled Microphone, Speaker and User Interface for a Vehicle Aug. 26, 2004.
A New Apporach in Intelligent Trailer Parking Sep. 12, 2010.
Automated Parking System for a Truck and Trailer.
Intelligent Parking Method for Trailers in Presence of Fixed and Moving Obastacles Aug. 22, 2010.

(56) References Cited

OTHER PUBLICATIONS

Intelligent Parking Method for Truck in Presence of Fixed and Moving Obstacles and Trailer in Presence of Fixed Obstacles: Advanced Fuzzy Logic Technologies in Industrial Applications Aug. 3, 2010.
Laser Scanner-Based Navigation for Commercial Vehicles Jun. 15, 2007.
Development of Performance Specifications for Collision Avoidance Systems for Lane Change, Merging and Backing Feb. 1995.
Verma et al., The Directional Behavior During Braking of a Tractor/Semi-Trailer Fitted With Anti-Locking Devices Sep. 28, 1984 http://trid.trb.org/view.aspx?id=160344.
Electronic Braking System New Generation htt://www.wabco-auto.com/uploads/media/Product_Brochure-EBS_04.pdf.
Wheel Direction Sensor System http://www.wheelmonitor.com/downloads/RM-50_Manual_Diagram_32006.pdf.
Meritor Wabco Reverse Detection Module for Trailers http://www.meritorhvs.com/MeritorHVS_Documents/tp02172.pdf.
Best Convenience & Productivity htt://www.google.co.in/url?sa=t&source=web&cd=8&ved=OCHUFiAH&url=http%3A%2F%2Fwww.ford.com%2Fservices%2Fcars-proxy%2FNGB5%2Fpdf%2Fpdf_8801F25B-7761-8299-E913-43ECE91343EC.pdf&rct=j&q=%22new%20trailer%22%20information%20through%20RFID%20tag%20to%20vehicle&el=LrOnTsb_EYHprAfhh8GyCO&usg=AFQiCNEvvrTdLo42rcyE67wujPc15WRJ3g&cad=ria.
RFID Read/Write Module http://www.grandideastudio.com/portfolio/rfid-read-write-module/.

\* cited by examiner

DETECTION OF AND COUNTER-MEASURES FOR JACKKNIFE ENABLING CONDITIONS DURING TRAILER BACKUP ASSIST

CROSS REFERENCE TO RELATED APPLICATIONS

This patent application is a continuation of U.S. non-provisional patent application which has Ser. No. 13/443,743, which was filed Apr. 10, 2012 which is a continuation-in-part application of U.S. non-provisional patent application which has Ser. No. 13/336,060, which was filed Dec. 23, 2011, which is entitled "Trailer Path Curvature Control For Trailer Backup Assist", which claims priority from U.S. Provisional Patent Application which has Ser. No. 61/477,132, which was filed Apr. 19, 2011, which is entitled "Trailer Backup Assist Curvature Control", and both of which have a common applicant herewith and are being incorporated herein in their entirety by reference.

FIELD OF THE DISCLOSURE

The disclosures made herein relate generally to driver assist and active safety technologies in vehicles and, more particularly, to implementing jackknife detection and counter-measures during back-up of a trailer.

BACKGROUND

It is well known that backing up a vehicle with a trailer attached is a difficult task for many drivers. This is particularly true for drivers who are untrained at backing with trailers such as, for example, those who drive with an attached trailer on an infrequent basis (e.g., have rented a trailer, use a personal trailer on an infrequent basis, etc). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another reason for such difficulty is that small errors in steering while backing a vehicle with an attached trailer are amplified, thereby causing the trailer to depart from a desired path.

To assist the driver in steering a vehicle with trailer attached, a trailer backup assist system needs to know the driver's intention. One common assumption with known trailer backup assist systems is that a driver of a vehicle with an attached trailer wants to back up straight and the system either implicitly or explicitly assumes a zero curvature path for the vehicle-trailer combination. Unfortunately most of real-world use cases of backing a trailer involve a curved path and, thus, assuming a path of zero curvature would significantly limit usefulness of the system. Some known systems assume that a path is known from a map or path planner. To this end, some known trailer backup assist systems operate under a requirement that a trailer back-up path is known before backing of the trailer commences such as, for example, from a map or a path planning algorithm. Undesirably, such implementations of the trailer backup assist systems are known to have a relatively complex Human Machine Interface (HMI) to specify the path, obstacles and/or goal of the backup maneuver. Furthermore, such systems also require some way to determine how well the desired path is being followed and to know when the desired goal, or stopping point and orientation, has been met, using approaches such as cameras, inertial navigation, or high precision GPS. These requirements lead to a relatively complex and costly system.

As previously mentioned, one reason backing a trailer can prove to be difficult is the need to control the vehicle in a manner that limits the potential for a jack-knife condition to occur. A trailer has attained a jackknife condition when a hitch angle cannot be reduced (i.e., made less acute) by application of a maximum steering input for the vehicle such as, for example, by moving steered front wheels of the vehicle to a maximum steered angle at a maximum rate of steering angle change. In the case of the jackknife angle being achieved, the vehicle must be pulled forward to relieve the hitch angle in order to eliminate the jackknife condition and, thus, allow the hitch angle to be controlled via manipulation of the steered wheels of the vehicle. However, in addition to the jackknife condition creating the inconvenient situation where the vehicle must be pulled forward, it can also lead to damage to the vehicle and/or trailer if certain operating conditions of the vehicle relating to its speed, engine torque, acceleration, and the like are not detected and counteracted. For example, if the vehicle is travelling at a suitably high speed and/or subjected to a suitably high longitudinal acceleration when the jackknife condition is achieved, the relative movement of the vehicle with respect to the trailer can lead to contact between the vehicle and trailer thereby damaging the trailer and/or the vehicle.

Therefore, an approach for detecting an actual or impending jackknife condition (i.e., a jackknife enabling condition) and correspondingly implementing a jackknife counter-measure and, optionally, a jackknife warning would be beneficial, desirable and useful.

SUMMARY OF THE DISCLOSURE

Embodiments of the inventive subject matter are directed to assisting a driver with backing a trailer attached to a vehicle in a manner that limits the potential for a jackknife condition being attained between the vehicle and the trailer. More specifically, embodiments of the inventive subject matter are directed to detecting an impending jackknife condition (i.e., a jackknife enabling condition) and correspondingly implementing a jackknife counter-measure for alleviating the impending jackknife condition. Optionally, in some embodiments of the inventive subject matter, a warning (e.g., tactile, audible, visual and/or the like) can be implemented in response to an impending and/or actual jackknife condition being detected. Accordingly, embodiments of the inventive subject matter contribute to trailer backup assist functionality being implemented in a manner that is relatively simple, effective, and safe.

In one embodiment of the inventive subject matter, a method comprises assessing jackknife determining information for a vehicle and a trailer towably attached to the vehicle and, in response to the jackknife determining information indicating that a jackknife enabling condition has been attained at a particular point in time during backing of the trailer by the vehicle, implementing a jackknife counter-measure. Implementing the jackknife counter-measure includes altering at least one vehicle operating parameter upon which the jackknife enabling condition is dependent.

In another embodiment of the inventive subject matter, a vehicle comprises a trailer angle detection apparatus and a trailer backup control system coupled to the trailer angle detection apparatus. The trailer angle detection apparatus is configured for outputting a signal generated as a function of an angle between the vehicle and a trailer towably attached to the vehicle. The trailer backup control system includes a jackknife enabling condition detector and a jackknife counter-measures controller. The jackknife counter-measures controller alters a setting of at least one vehicle operating parameter for alleviating an adverse jackknife condition during backing of the trailer by the vehicle when the jackknife enabling condition detector determines that a jackknife enabling condition has been attained at a particular point in time during backing of the trailer by the vehicle.

In another embodiment of the inventive subject matter, an electronic control system has a set of instructions tangibly embodied on a non-transitory processor-readable medium thereof. The set of instructions are accessible from the non-transitory processor-readable medium by at least one data processing device of the electronic controller system for being interpreted thereby. The set of instructions is configured for causing at least one data processing device to carry out operations for assessing jackknife determining information for a vehicle and a trailer towably attached to the vehicle and, in response to the jackknife determining information indicating that a jackknife enabling condition has been attained at a particular point in time during backing of the trailer by the vehicle, for implementing a jackknife counter-measure. Implementing the jackknife counter-measure includes altering at least one vehicle operating parameter upon which the jackknife enabling condition is dependent.

These and other objects, embodiments, advantages and/or distinctions of the inventive subject matter will become readily apparent upon further review of the following specification, associated drawings and appended claims.

DETAILED DESCRIPTION OF THE DRAWING FIGURES

The inventive subject matter is directed to providing trailer backup assist functionality. In particular, such trailer backup assist functionality is directed to implementing one or more countermeasures for limiting the potential of a jackknife condition being attained between a vehicle and a trailer being towed by the vehicle. In certain embodiments of the inventive subject matter, curvature of a path of travel of the trailer (i.e., trailer path curvature control) can be controlled by allowing a driver of the vehicle to specify a desired path of the trailer by inputting a desired trailer path curvature as the backup maneuver of the vehicle and trailer progresses. Although a control knob, a set of virtual buttons, or a touch screen can each be implemented for enabling trailer path curvature control, the inventive subject matter is not unnecessarily limited to any particular configuration of interface through which a desired trailer path curvature is inputted. Furthermore, in the case where a steering wheel can be mechanically decoupled from steered wheels of the vehicle, the steering wheel can also be used as an interface through which a desired trailer path curvature is inputted. As will be discussed herein in greater detail, kinematical information of a system defined by the vehicle and the trailer are used to calculate a relationship (i.e., kinematics) between the trailer's curvature and the steering angle of the vehicle for determining steering angle changes of the vehicle for achieving the specified trailer path. Steering commands corresponding to the steering angle changes are used for controlling a steering system of the tow vehicle (e.g., electric power assisted steering (EPAS) system) for implementing steering angle changes of steered wheels of the vehicle to achieve (e.g., to approximate) the specified path of travel of the trailer.

Figure 1:
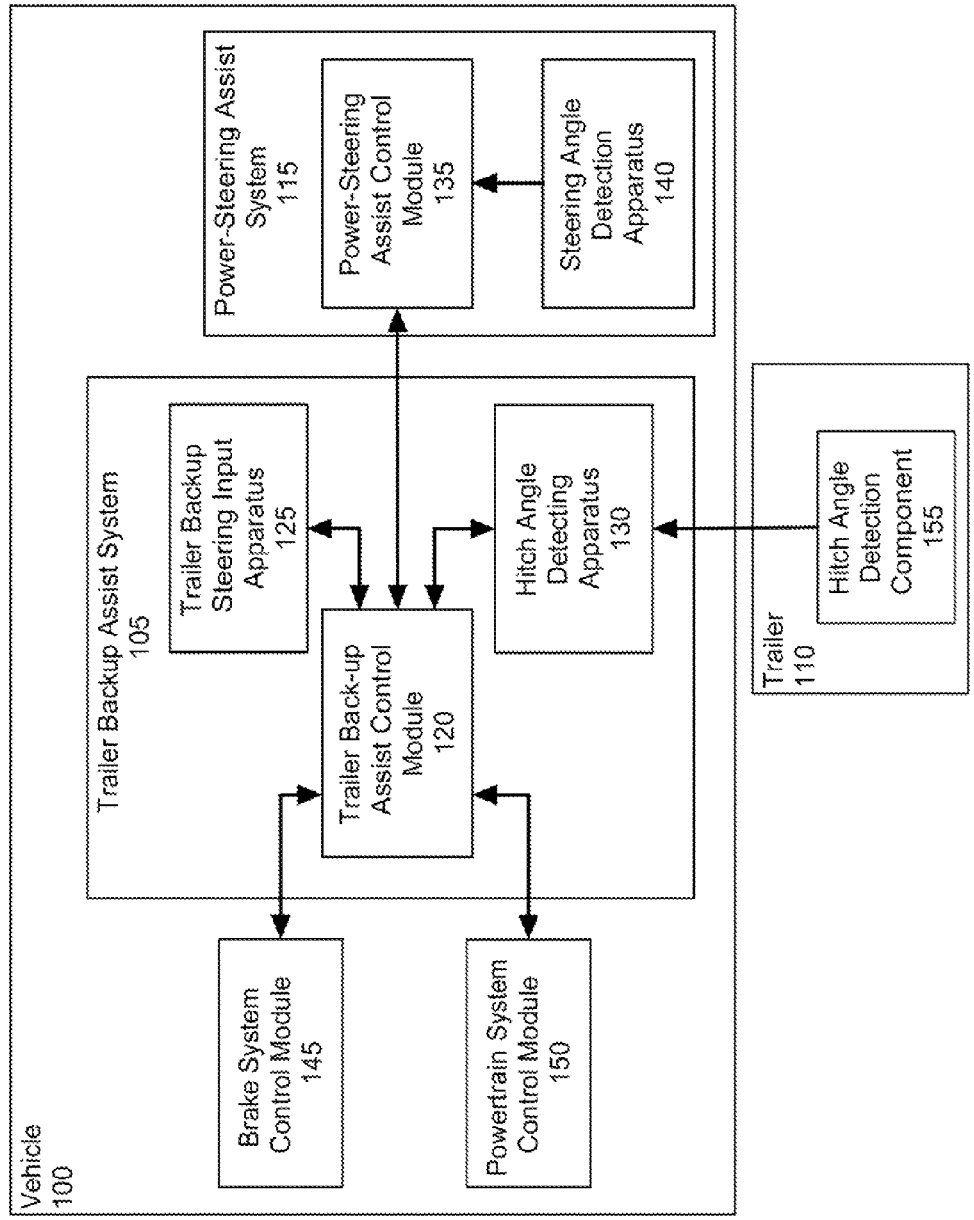
FIG. 1 shows a vehicle configured for performing trailer backup assist functionality in accordance with an embodiment of the inventive subject matter embodiment.

Referring to FIG. 1, an embodiment of a vehicle 100 configured for performing trailer backup assist functionality in accordance with the inventive subject matter is shown. A trailer backup assist system 105 of the vehicle 100 controls the curvature of path of travel of the trailer 110 that is attached to the vehicle 100. Such control is accomplished through interaction of a power assisted steering system 115 of the vehicle 100 and the trailer backup assist system 105. During operation of the trailer backup assist system 105 while the vehicle 100 is being reversed, a driver of the vehicle 100 is sometimes limited in the manner in which he/she can make steering inputs via a steering wheel of the vehicle 100. This is because in certain vehicles the trailer backup assist system 105 is in control of the power assisted steering system 115 and the power assisted steering system 115 is directly coupled to the steering wheel (i.e., the steering wheel of the vehicle 100 moves in concert with steered wheels of the vehicle 100). As is discussed below in greater detail, a human machine interface (HMI) of the backup assist system 105 is used for commanding changes in curvature of a path of the trailer 110 such as a knob, thereby decoupling such commands from being made at the steering wheel of the vehicle 100. However, some vehicles configured to provide trailer backup assist functionality in accordance with the inventive subject matter will have the capability to selectively decouple steering movement from movement of steerable wheels of the vehicle, thereby allowing the steering wheel to be used for commanding changes in curvature of a path of a trailer during such trailer backup assist.

The trailer backup assist system 105 includes a trailer backup assist control module 120, a trailer backup steering input apparatus 125, and a hitch angle detecting apparatus 130. The trailer backup assist control module 120 is connected to the trailer backup steering input apparatus 125 and the hitch angle detecting apparatus 130 for allowing communication of information there between. It is disclosed herein that the trailer backup steering input apparatus can be coupled to the trailer backup assist control module 120 in a wired or wireless manner. The trailer backup assist system control module 120 is attached to a power-steering assist control module 135 of the power-steering assist system 115 for allowing information to be communicated therebetween. A steering angle detecting apparatus 140 of the power-steering assist system 115 is connected to the power-steering assist control module 135 for providing information thereto. The trailer backup assist system is also attached to a brake system control module 145 and a powertrain control module 150 for allowing communication of information therebetween. Jointly, the trailer backup assist system 105, the power-steering assist system 115, the brake system control module 145, the powertrain control module 150 define a trailer backup assist architecture configured in accordance with an embodiment of the inventive subject matter.

The trailer backup assist control module 120 is configured for implementing logic (i.e., instructions) for receiving information from the trailer backup steering input apparatus 125, the hitch angle detecting apparatus 130, the power-steering assist control module 135, the brake system control module 145, and the powertrain control module 150. The trailer backup assist control module 120 (e.g., a trailer curvature algorithm thereof) generates vehicle steering information as a function of all or a portion of the information received from the trailer backup steering input apparatus 125, the hitch angle detecting apparatus 130, the power-steering assist control module 135, the brake system control module 145, and the powertrain control module 150. Thereafter, the vehicle steering information is provided to the power-steering assist control module 135 for affecting steering of the vehicle 100 by the power-steering assist system 115 to achieve a commanded path of travel for the trailer 110.

The trailer backup steering input apparatus 125 provides the trailer backup assist control module 120 with information defining the commanded path of travel of the trailer 110 to the trailer backup assist control module 120 (i.e. trailer steering information). The trailer steering information can include information relating to a commanded change in the path of travel (e.g., a change in radius of path curvature) and information relating to an indication that the trailer is to travel along a path defined by a longitudinal centerline axis of the trailer (i.e. along a substantially straight path of travel). As will be discussed below in detail, the trailer backup steering input apparatus 125 preferably includes a rotational control input device for allowing a driver of the vehicle 100 to interface with the trailer backup steering input apparatus 125 to command desired trailer steering actions (e.g., commanding a desired change in radius of the path of travel of the trailer and/or commanding that the trailer travel along a substantially straight path of travel as defined by a longitudinal centerline axis of the trailer). In a preferred embodiment, the rotational control input device is a knob rotatable about a rotational axis extending through a top surface/face of the knob. In other embodiments, the rotational control input device is a knob rotatable about a rotational axis extending substantially parallel to a top surface/face of the knob.

Some vehicles (e.g., those with active front steer) have a power-steering assist system configuration that allows a steering wheel to be decoupled from movement of the steered wheels of such a vehicle. Accordingly, the steering wheel can be rotated independent of the manner in which the power-steering assist system of the vehicle controls the steered wheels (e.g., as commanded by vehicle steering information provided by a power-steering assist system control module from a trailer backup assist system control module configured in accordance with an embodiment of the inventive subject matter). As such, in these types of vehicles where the steering wheel can be selectively decoupled from the steered wheels to allow independent operation thereof, trailer steering information of a trailer backup assist system configured in accordance with the inventive subject matter can be provided through rotation of the steering wheel. Accordingly, it is disclosed herein that in certain embodiments of the inventive subject matter, the steering wheel is an embodiment of a rotational control input device in the context of the inventive subject matter. In such embodiments, the steering wheel would be biased (e.g., by an apparatus that is selectively engagable/activatable) to an at-rest position between opposing rotational ranges of motion.

The hitch angle detecting apparatus 130, which operates in conjunction with a hitch angle detection component 155 of the trailer 110, provides the trailer backup assist control module 120 with information relating to an angle between the vehicle 100 and the trailer 110 (i.e., hitch angle information). In a preferred embodiment, the hitch angle detecting apparatus 130 is a camera-based apparatus such as, for example, an existing rear view camera of the vehicle 100 that images (i.e., visually monitors) a target (i.e., the hitch angle detection component 155) attached the trailer 110 as the trailer 110 is being backed by the vehicle 100. Preferably, but not necessarily, the hitch angle detection component 155 is a dedicated component (e.g., an item attached to/integral with a surface of the trailer 110 for the express purpose of being recognized by the hitch angle detecting apparatus 130). Alternatively, the hitch angle detecting apparatus 130 can be a device that is physically mounted on a hitch component of the vehicle 100 and/or a mating hitch component of the trailer 110 for determining an angle between centerline longitudinal axes of the vehicle 100 and the trailer 110. The hitch angle detecting apparatus 130 can be configured for detecting a jackknife enabling condition and/or related information (e.g., when a hitch angle threshold has been met).

The power-steering assist control module 135 provides the trailer backup assist control module 120 with information relating to a rotational position (e.g., angle) of the steering wheel angle and/or a rotational position (e.g., turning angle(s)) of steered wheels of the vehicle 100. In certain embodiments of the inventive subject matter, the trailer backup assist control module 120 can be an integrated component of the power steering assist system 115. For example, the power-steering assist control module 135 can include a trailer back-up assist algorithm for generating vehicle steering information as a function of all or a portion of information received from the trailer backup steering input apparatus 125, the hitch angle detecting apparatus 130, the power-steering assist control module 135, the brake system control module 145, and the powertrain control module 150.

The brake system control module 145 provides the trailer backup assist control module 120 with information relating to vehicle speed. Such vehicle speed information can be determined from individual wheel speeds as monitored by the brake system control module 145. In some instances, individual wheel speeds can also be used to determine a vehicle yaw angle and/or yaw angle rate and such yaw angle and/or yaw angle rate can be provided to the trailer backup assist control module 120 for use in determining the vehicle steering information. In certain embodiments, the trailer backup assist control module 120 can provide vehicle braking information to the brake system control module 145 for allowing the trailer backup assist control module 120 to control braking of the vehicle 100 during backing of the trailer 110. For example, using the trailer backup assist control module 120 to regulate speed of the vehicle 100 during backing of the trailer 110 can reduce the potential for unacceptable trailer backup conditions. Examples of unacceptable trailer backup conditions include, but are not limited to, a vehicle overspeed condition, trailer angle dynamic instability, a trailer jackknife condition as defined by an angular displacement limit relative to the vehicle 100 and the trailer 110, and the like. It is disclosed herein that the backup assist control module 120 can issue a signal corresponding to a notification (e.g., a warning) of an actual, impending, and/or anticipated unacceptable trailer backup condition.

The powertrain control module 150 interacts with the trailer backup assist control module 120 for regulating speed and acceleration of the vehicle 100 during backing of the trailer 110. As mentioned above, regulation of the speed of the vehicle 100 is necessary to limit the potential for unacceptable trailer backup conditions such as, for example, jack-knifing and trailer angle dynamic instability. Similar to high-speed considerations as they relate to unacceptable trailer backup conditions, high acceleration can also lead to such unacceptable trailer backup conditions.

Figure 2:
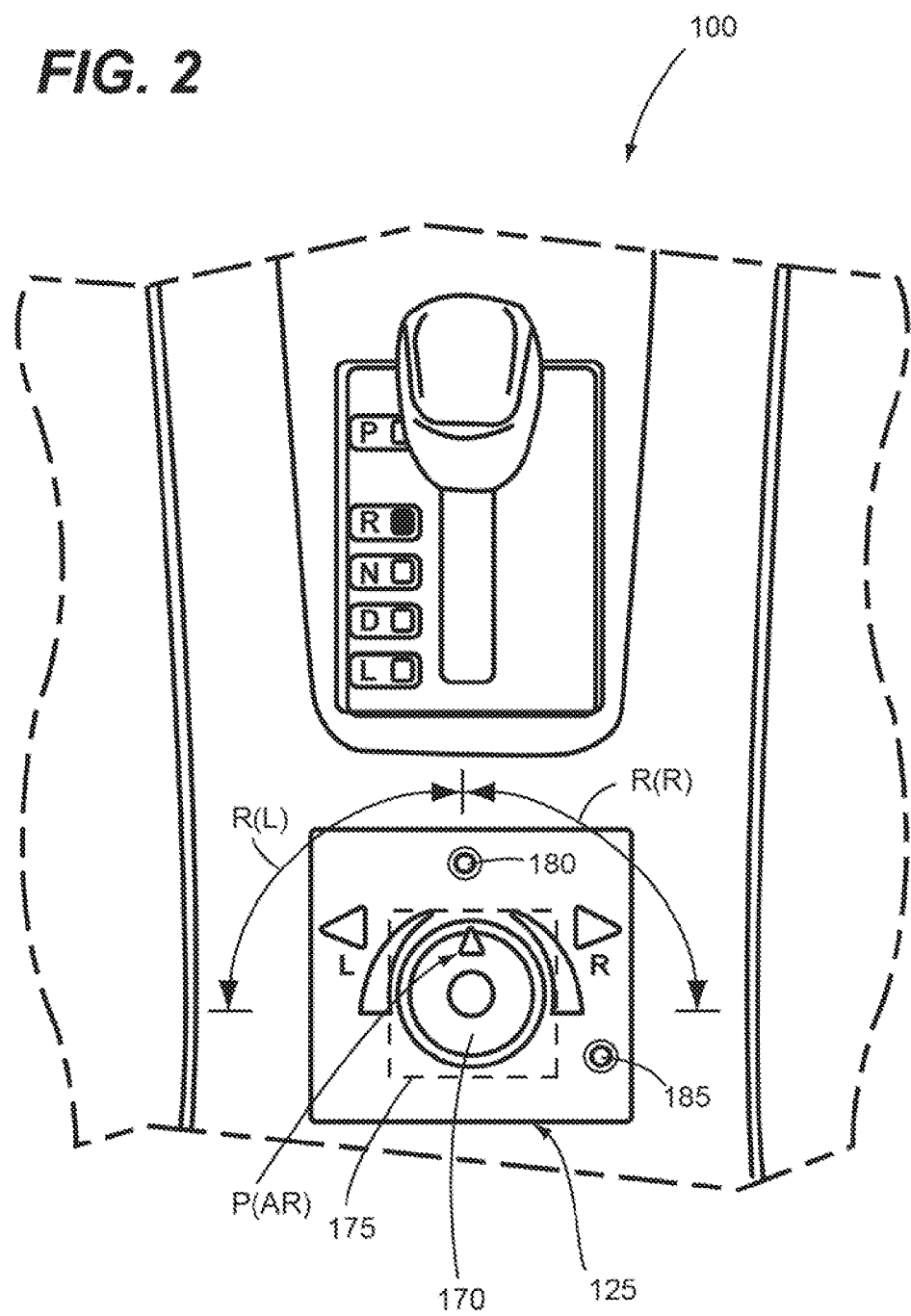
FIG. 2 shows a preferred embodiment of the trailer backup steering input apparatus discussed in reference to FIG. 1.

Referring now to FIG. 2, a preferred embodiment of the trailer backup steering input apparatus 125 discussed in reference to FIG. 1 is shown. A rotatable control element in the form of a knob 170 is coupled to a movement sensing device 175. The knob 170 is biased (e.g., by a spring return) to an at-rest position P(AR) between opposing rotational ranges of motion R(R), R(L). A first one of the opposing rotational ranges of motion R(R) is substantially equal to a second one of the opposing rotational ranges of motion R(L), R(R). To provide a tactile indication of an amount of rotation of the knob 170, a force that biases the knob 170 toward the at-rest position P(AR) can increase (e.g., non-linearly) as a function of the amount of rotation of the knob 170 with respect to the at-rest position P(AR). Additionally, the knob 170 can be configured with position indicating detents such that the driver can positively feel the at-rest position P(AR) and feel the ends of the opposing rotational ranges of motion R(L), R(R) approaching (e.g., soft end stops).

The movement sensing device 175 is configured for sensing movement of the knob 170 and outputting a corresponding signal (i.e., movement sensing device signal) to the trailer assist backup input apparatus 125 shown in FIG. 1. The movement sensing device signal is generated as a function of an amount of rotation of the knob 170 with respect to the at-rest position P(AR), a rate movement of the knob 170, and/or a direction of movement of the knob 170 with respect to the at-rest position P(AR). As will be discussed below in greater detail, the at-rest position P(AR) of the knob 170 corresponds to a movement sensing device signal indicating that the vehicle 100 should be steered such that the trailer 100 is backed along a substantially straight path as defined by a centerline longitudinal axis of the trailer 110 when the knob 170 was returned to the at-rest position P(AR) and a maximum clockwise and anti-clockwise position of the knob 170 (i.e., limits of the opposing rotational ranges of motion R(R), R(L)) each corresponds to a respective movement sensing device signal indicating a tightest radius of curvature (i.e., most acute trajectory) of a path of travel of the trailer 110 that is possible without the corresponding vehicle steering information causing a jack-knife condition. In this regard, the at-rest position P(AR) is a zero curvature commanding position with respect to the opposing rotational ranges of motion R(R), R(L). It is disclosed herein that a ratio of a commanded curvature of a path of a trailer (e.g., radius of a trailer trajectory) and a corresponding amount of rotation of the knob can vary (e.g., non-linearly) over each one of the opposing rotational ranges of motion R(L), R(R) of the knob 170. It is also disclosed therein that the ratio can be a function of vehicle speed, trailer geometry, vehicle geometry, hitch geometry and/or trailer load.

Use of the knob 170 decouples trailer steering inputs from being made at a steering wheel of the vehicle 100. In use, as a driver of the vehicle 100 backs the trailer 110, the driver can turn the knob 170 to dictate a curvature of a path of the trailer 110 to follow and returns the knob 170 to the at-rest position P(AR) for causing the trailer 110 to be backed along a straight line. Accordingly, in embodiments of trailer backup assist systems where the steering wheel remains physically coupled to the steerable wheels of a vehicle during backup of an attached trailer, a rotatable control element configured in accordance with the inventive subject matter (e.g., the knob 170) provides a simple and user-friendly means of allowing a driver of a vehicle to input trailer steering commands.

It is disclosed herein that a rotational control input device configured in accordance with embodiments of the inventive subject matter (e.g. the knob 170 and associated movement sensing device) can omit a means for being biased to an at-rest position between opposing rotational ranges of motion. Lack of such biasing allows a current rotational position of the rotational control input device to be maintained until the rotational control input device is manually moved to a different position. Preferably, but not necessarily, when such biasing is omitted, a means is provided for indicating that the rotational control input device is positioned in a zero curvature commanding position (e.g., at the same position as the at-rest position in embodiments where the rotational control input device is biased). Examples of means for indicating that the rotational control input device is positioned in the zero curvature commanding position include, but are not limited to, a detent that the rotational control input device engages when in the zero curvature commanding position, a visual marking indicating that the rotational control input device is in the zero curvature commanding position, an active vibratory signal indicating that the rotational control input device is in or approaching the zero curvature commanding position, an audible message indicating that the rotational control input device is approaching the zero curvature commanding position, and the like.

It is also disclosed herein that embodiments of the inventive subject matter can be configured with a control input device that is not rotational (i.e., a non-rotational control input device). Similar to a rotational control input device configured in accordance with embodiments of the inventive subject matter (e.g., the knob 170 and associated movement sensing device), such a non-rotational control input device is configured to selectively provide a signal causing a trailer to follow a path of travel segment that is substantially straight and to selectively provide a signal causing the trailer to follow a path of travel segment that is substantially curved. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input path of travel commands, and the like.

The trailer backup steering input apparatus 125 can be configured to provide various feedback information to a driver of the vehicle 100. Examples of situation that such feedback information can include, but are not limited to, a status of the trailer backup assist system 105 (e.g., active, in standby (e.g., when driving forward to reduce the trailer angle), faulted, inactive, etc), that a curvature limit has been reached (i.e., maximum commanded curvature of a path of travel of the trailer 110), etc. To this end, the trailer backup steering input apparatus 125 can be configured to provide a tactile feedback signal (e.g., a vibration through the knob 170) as a warning if any one of a variety of conditions occur. Examples of such conditions include, but are not limited to, the trailer 110 having jack-knifed, the trailer backup assist system 105 has had a failure, the trailer backup assist system 105 or other system of the vehicle 100 has predicted a collision on the present path of travel of the trailer 110, the trailer backup system 105 has restricted a commanded curvature of a trailer's path of travel (e.g., due to excessive speed or acceleration of the vehicle 100), and the like. Still further, it is disclosed that the trailer backup steering input apparatus 125 can use illumination (e.g., an LED 180) and/or an audible signal output (e.g., an audible output device 185) to provide certain feedback information (e.g., notification/warning of an unacceptable trailer backup condition).

Figure 3:
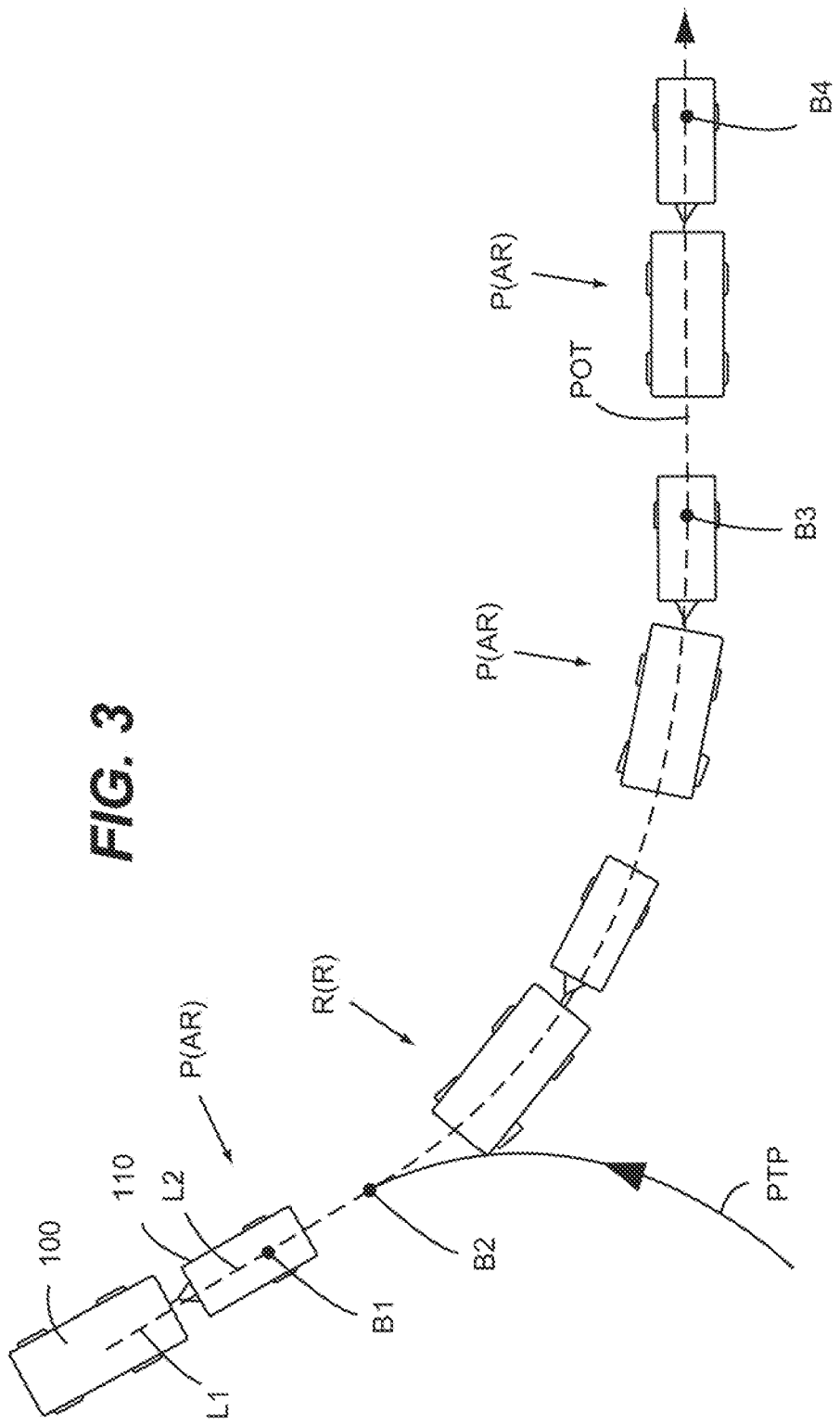
FIG. 3 shows an example of a trailer backup sequence implemented using the trailer backup steering input apparatus discussed in reference to FIG. 2.

Referring now to FIGS. 2 and 3, an example of using the trailer backup steering input apparatus 125 for dictating a curvature of a path of travel (POT) of a trailer (i.e., the trailer 110 shown in FIG. 1) while backing up the trailer with a vehicle (i.e., the vehicle 100 in FIGS. 1 and 2) is shown. In preparation of backing the trailer 110, the driver of the vehicle 100 drives the vehicle 100 forward along a pull-thru path (PTP) to position the vehicle 100 and trailer 110 at a first backup position B1. In the first backup position BL, the vehicle 100 and trailer 110 are longitudinally aligned with each other such that a longitudinal centerline axis L1 of the vehicle 100 is aligned with (e.g. parallel with or coincidental with) a longitudinal centerline axis L2 of the trailer 110. It is disclosed herein that such alignment of the longitudinal axes L1, L2 at the onset of an instance of trailer backup functionality is not a requirement for operability of a trailer backup assist system configured in accordance with the inventive subject matter.

After activating the trailer backup assist system 105 (e.g., before, after, or during the pull-thru sequence), the driver begins to back the trailer 110 by reversing the vehicle 100 from the first backup position B1. So long as the knob 170 of the trailer backup steering input apparatus 125 remains in the at-rest position P(AR), the trailer backup assist system 105 will steer the vehicle 100 as necessary for causing the trailer 110 to be backed along a substantially straight path of travel as defined by the longitudinal centerline axis L2 of the trailer 110 at the time when backing of the trailer 110 began. When the trailer reaches the second backup position B2, the driver rotates the knob 170 to command the trailer 110 to be steered to the right (i.e., a knob position R(R)). Accordingly, the trailer backup assist system 105 will steer the vehicle 100 for causing the trailer 110 to be steered to the right as a function of an amount of rotation of the knob 170 with respect to the at-rest position P(AR), a rate movement of the knob 170, and/or a direction of movement of the knob 170 with respect to the at-rest position P(AR). Similarly, the trailer 110 can be commanded to steer to the left by rotating the knob 170 to the left. When the trailer reaches backup position B3, the driver allows the knob 170 to return to the at-rest position P(AR) thereby causing the trailer backup assist system 105 to steer the vehicle 100 as necessary for causing the trailer 110 to be backed along a substantially straight path of travel as defined by the longitudinal centerline axis L2 of the trailer 110 at the time when the knob 170 was returned to the at-rest position P(AR). Thereafter, the trailer backup assist system 105 steers the vehicle 100 as necessary for causing the trailer 110 to be backed along this substantially straight path to the fourth backup position B4. In this regard, arcuate (e.g., curved) portions of a path of travel POT of the trailer 110 are dictated by rotation of the knob 170 and straight portions of the path of travel POT are dictated by an orientation of the centerline longitudinal axis L2 of the trailer when the knob 170 is in/returned to the at-rest position P(AR).

Figure 4:
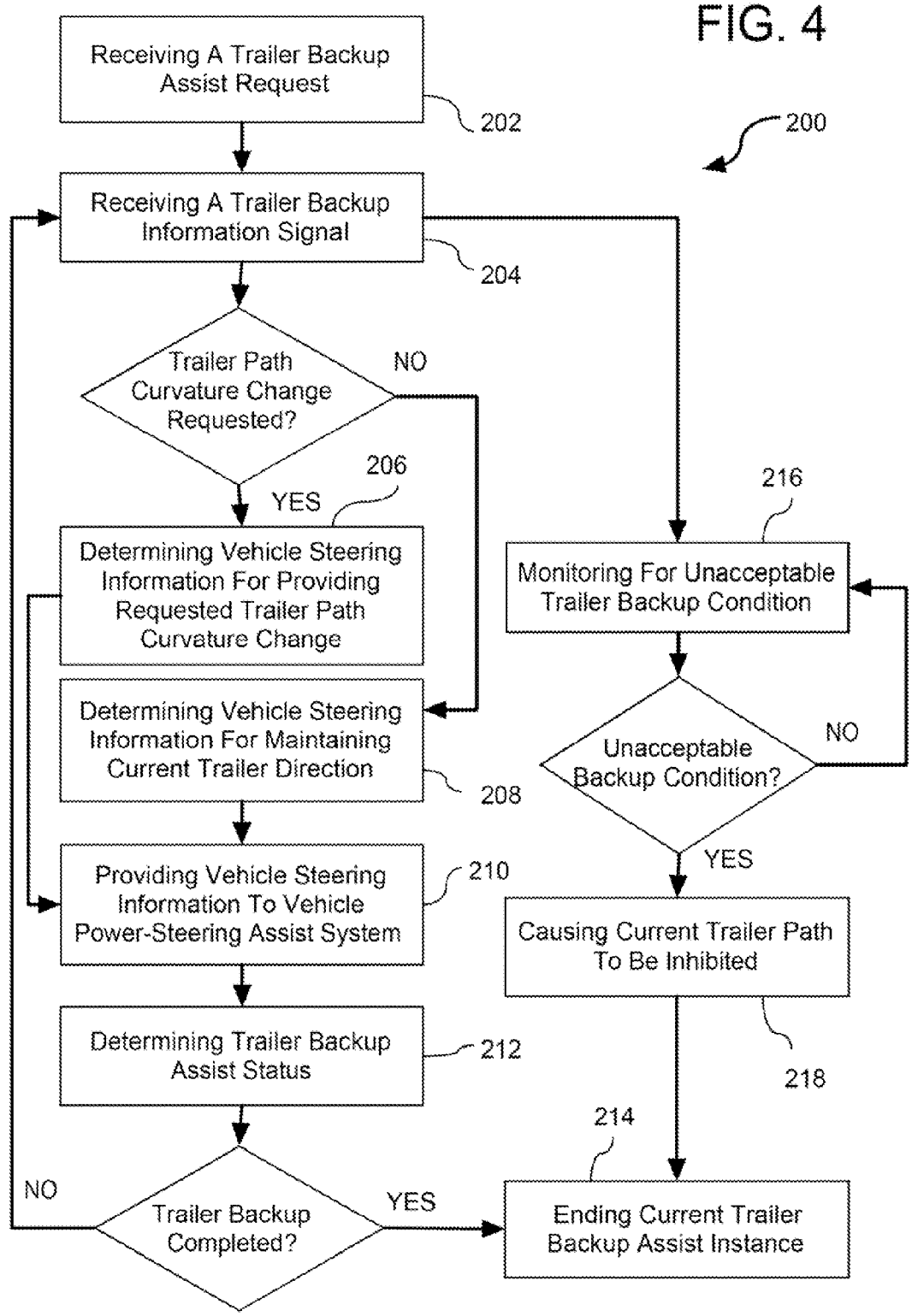
FIG. 4 shows a method for implementing trailer backup assist functionality in accordance with an embodiment of the inventive subject matter.

FIG. 4 shows a method 200 for implementing trailer backup assist functionality in accordance with an embodiment of the inventive subject matter. In a preferred embodiment, the method 200 for implementing trailer backup assist functionality can be carried out using the trailer backup assist architecture discussed above in reference to the vehicle 100 and trailer 110 of FIG. 1. Accordingly, trailer steering information is provided through use of a rotational control input device (e.g., the knob 170 discussed in reference to FIG. 2).

An operation 202 is performed for receiving a trailer backup assist request. Examples of receiving the trailer backup assist request include activating the trailer backup assist system and providing confirmation that the vehicle and trailer are ready to be backed. After receiving a trailer backup assist request (i.e., while the vehicle is being reversed), an operation 204 is performed for receiving a trailer backup information signal. Examples of information carried by the trailer backup information signal include, but is not limited to, information from the trailer backup steering input apparatus 125, information from the hitch angle detecting apparatus 130, information from the power-steering assist control module 135, information from the brake system control module 145, and information from the powertrain control module 150. It is disclosed herein that information from the trailer backup steering input apparatus 125 preferably includes trailer path curvature information characterizing a desired curvature for the path of travel of the trailer, such as provided by the trailer backup steering input apparatus 125 discussed above in reference to FIGS. 1 and 2. In this manner, the operation 204 for receiving the trailer backup information signal can include receiving trailer path curvature information characterizing the desired curvature for the path of travel of the trailer.

If the trailer backup information signal indicates that a change in curvature of the trailer's path of travel is requested (i.e. commanded via the knob 170), an operation 206 is performed for determining vehicle steering information for providing the requested change in curvature of the trailer's path of travel. Otherwise, an operation 208 is performed for determining vehicle steering information for maintaining a current straight-line heading of the trailer (i.e., as defined by the longitudinal centerline axis of the trailer). Thereafter, an operation 210 is performed for providing the vehicle steering information to a power-steering assist system of the vehicle, followed by an operation 212 being performed for determining the trailer backup assist status. If it is determined that trailer backup is complete, an operation 214 is performed for ending the current trailer backup assist instance. Otherwise the method 200 returns to the operation 204 for receiving trailer backup information. Preferably, the operation for receiving the trailer backup information signal, determining the vehicle steering information, providing the vehicle steering information, and determining the trailer backup assist status are performed in a monitoring fashion (e.g., at a high rate of speed of a digital data processing device). Accordingly, unless it is determined that reversing of the vehicle for backing the trailer is completed (e.g., due to the vehicle having been successfully backed to a desired location during a trailer backup assist instance, the vehicle having to be pulled forward to begin another trailer backup assist instance, etc), the method 200 will continually be performing the operations for receiving the trailer backup information signal, determining the vehicle steering information, providing the vehicle steering information, and determining the trailer backup assist status.

It is disclosed herein that the operation 206 for determining vehicle steering information for providing the requested change in curvature of the trailer's path of travel preferably includes determining vehicle steering information as a function of trailer path curvature information contained within the trailer backup information signal. As will be discussed below in greater detail, determining vehicle steering information can be accomplished through a low order kinematic model defined by the vehicle and the trailer. Through such a model, a relationship between the trailer path curvature and commanded steering angles of steered wheels of the vehicle can be generated for determining steering angle changes of the steered wheels for achieving a specified trailer path curvature. In this manner, the operation 206 for determining vehicle steering information can be configured for generating information necessary for providing trailer path curvature control in accordance with the inventive subject matter.

In some embodiments of the inventive subject matter, the operation 210 for providing the vehicle steering information to the power-steering assist system of the vehicle causes the steering system to generate a corresponding steering command as a function of the vehicle steering information. The steering command is interpretable by the steering system and is configured for causing the steering system to move steered wheels of the steering system for achieving a steered angle as specified by the vehicle steering information. Alternatively, the steering command can be generated by a controller, module or computer external to the steering system (e.g., a trailer backup assist control module) and be provided to the steering system.

In parallel with performing the operations for receiving the trailer backup information signal, determining the vehicle steering information, providing the vehicle steering information, and determining the trailer backup assist status, the method 200 performs an operation 216 for monitoring the trailer backup information for determining if an unacceptable trailer backup condition exists. Examples of such monitoring include, but are not limited to assessing a hitch angle to determine if a hitch angle threshold is exceeded, assessing a backup speed to determine if a backup speed threshold is exceeded, assessing vehicle steering angle to determine if a vehicle steering angle threshold is exceeded, assessing other operating parameters (e.g., vehicle longitudinal acceleration, throttle pedal demand rate and hitch angle rate) for determining if a respective threshold value is exceeded, and the like. Backup speed can be determined from wheel speed information obtained from one or more wheel speed sensors of the vehicle. If it is determined that an unacceptable trailer backup condition exists, an operation 218 is performed for causing the current path of travel of the trailer to be inhibited (e.g., stopping motion of the vehicle), followed by the operation 214 being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable trailer angle condition is impending or approaching. In one example, if such feedback results in the unacceptable trailer angle condition being remedied prior to achieving a critical condition, the method can continue with providing trailer backup assist functionality in accordance with operations 204-212. Otherwise, the method can proceed to operation 214 for ending the current trailer backup assist instance. In conjunction with performing the operation 214 for ending the current trailer backup assist instance, an operation can be performed for controlling movement of the vehicle to correct or limit a jackknife condition (e.g., steering the vehicle, decelerating the vehicle, limiting magnitude and/or rate of driver requested trailer curvature input, and/or the like to preclude the hitch angle from being exceeded).

Turning now to a discussion of a kinematic model used to calculate a relationship between a curvature of a path of travel of a trailer and the steering angle of a vehicle towing the trailer, a low order kinematic model can be desirable for a trailer back-up assist system configured in accordance with some embodiments of the inventive subject matter. To achieve such a low order kinematic model, certain assumptions are made with regard to parameters associated with the vehicle/trailer system. Examples of such assumptions include, but are not limited to, the trailer being backed by the vehicle at a relatively low speed, wheels of the vehicle and the trailer having negligible (e.g., no) slip, negligible (e.g., no) vehicle lateral compliance, tires of the vehicle and the trailer having negligible (e.g., no) deformation, actuator dynamics of the vehicle being negligible, the vehicle and the trailer exhibiting negligible (e.g., no) roll or pitch motions.

Figure 5:
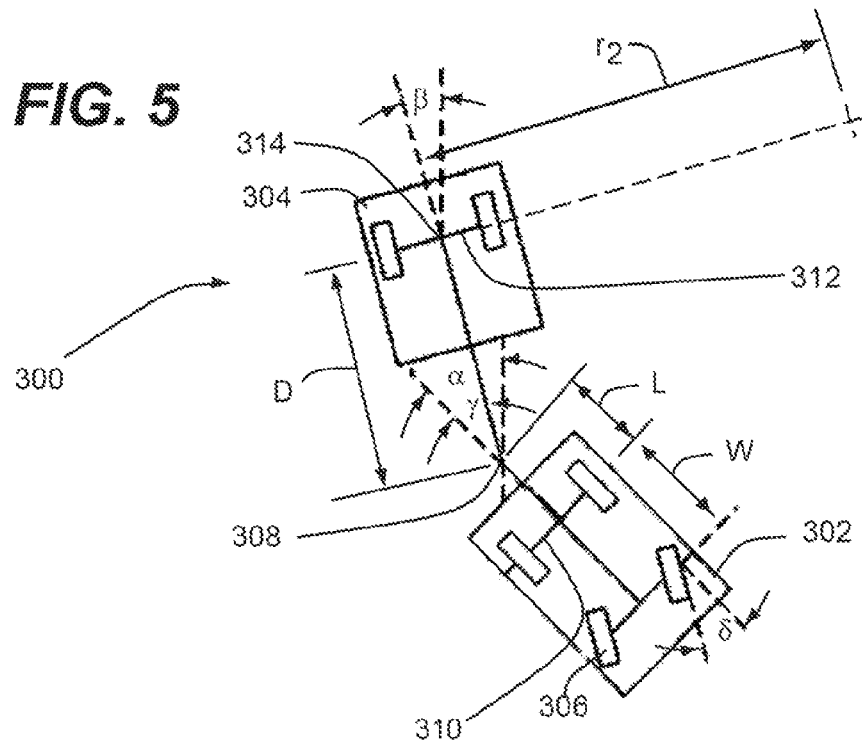
FIG. 5 is a diagrammatic view showing a kinematic model configured for providing information utilized in providing trailer backup assist functionality in accordance with the inventive subject matter.

As shown in FIG. 5, for a system defined by a vehicle 302 and a trailer 304, the kinematic model 300 is based on various parameters associated with the vehicle 302 and the trailer 304. These kinematic model parameters include:

$\delta$: steering angle at steered front wheels 306 of the vehicle 302;
$\alpha$: yaw angle of the vehicle 302;
$\beta$: yaw angle of the trailer 304;
$\gamma$: hitch angle ($\gamma=\beta-\alpha$);
W: wheel base of the vehicle 302;
L: length between hitch point 308 and rear axle 310 of the vehicle 302;
D: length between hitch point 308 and axle 312 of the trailer 304; and
$r_2$: curvature radius for the trailer 304.

The kinematic model 300 of FIG. 5 reveals a relationship between trailer path radius of curvature $r_2$ at the midpoint 314 of an axle 306 of the trailer 304, steering angle $\delta$ of the steered wheels 306 of the vehicle 302, and the hitch angle $\gamma$. As shown in the equation below, this relationship can be expressed to provide the trailer path curvature $\kappa_2$ such that, if $\gamma$ is given, the trailer path curvature $\kappa_2$ can be controlled based on regulating the steering angle $\delta$ (where $\dot\beta(.)$ is trailer yaw rate and $\eta(.)$ is trailer velocity).

$$\kappa_2 = \frac{1}{r_2} = \frac{\dot\beta}{\dot\eta} = \frac{\left(W+\frac{KV^2}{g}\right)\sin\gamma + L\cos\gamma\tan\delta}{D\left(\left(W+\frac{KV^2}{g}\right)\cos\gamma - L\sin\gamma\tan\delta\right)}$$

Or, this relationship can be expressed to provide the steering angle $\delta$ as a function of trailer path curvature $\kappa 2$ and hitch angle $\gamma$.

$$\delta = \tan^{-1}\left(\frac{\left(W+\frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain kinematic model parameters (e.g. D, W and L) are constant and assumed known. V is the vehicle longitudinal speed and g is the acceleration due to gravity. K is a speed dependent parameter which when set to zero makes the calculation of steering angle independent of vehicle speed. For example, vehicle-specific kinematic model parameters can be predefined in an electronic control system of a vehicle and trailer-specific kinematic model parameters can be inputted by a driver of the vehicle. Trailer path curvature $\kappa_2$ is determined from the driver input via a trailer backup steering input apparatus. Through the use of the equation for providing steering angle, a corresponding steering command can be generated for controlling a steering system (e.g., an actuator thereof) of the vehicle.

Figure 6:
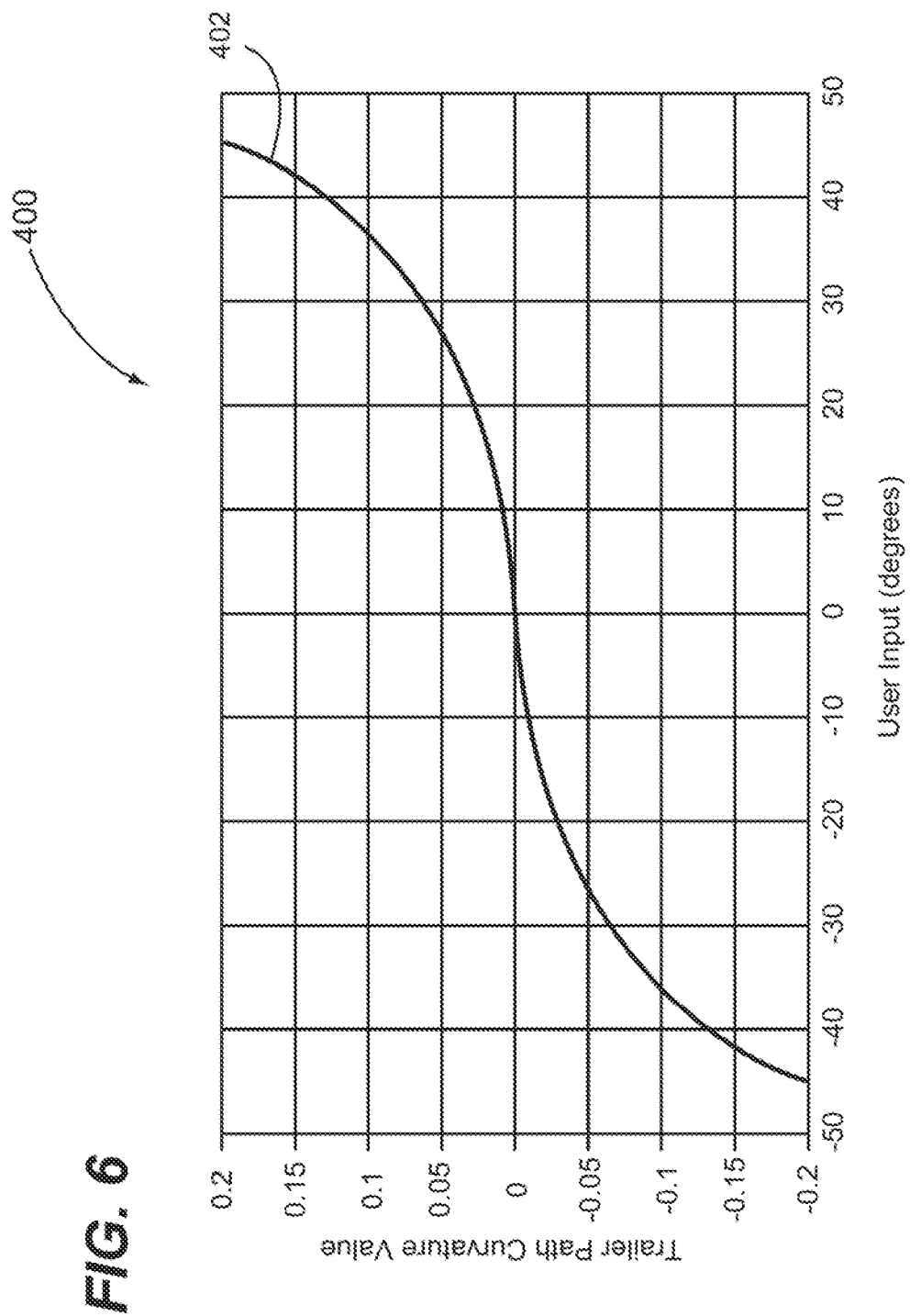
FIG. 6 is a graph showing an example of a trailer path curvature function plot for a rotary-type trailer backup steering input apparatus configured in accordance with the inventive subject matter.

FIG. 6 shows an example of a trailer path curvature function plot 400 for a rotary-type trailer backup steering input apparatus (e.g., the trailer backup steering input apparatus 125 discussed above in reference to FIGS. 1 and 2). A value representing trailer path curvature (e.g., trailer path curvature $\kappa2$) is provided as an output signal from the rotary-type trailer backup steering input apparatus as a function of user input movement. In this example, a curve 402 specifying trailer path curvature relative to user input (e.g., amount of rotation) at a rotary input device (e.g., a knob) is defined by a cubic function. However, a skilled person will appreciate that embodiments of the inventive subject matter are not limited to any particular function between a magnitude and/or rate of input at a trailer backup steering input apparatus (e.g., knob rotation) and a resulting trailer path curvature value.

Referring to FIG. 5, in preferred embodiments of the inventive subject matter, it is desirable to limit the potential for the vehicle 302 and the trailer 304 to attain a jackknife angle (i.e., the vehicle/trailer system achieving a jackknife condition). A jackknife angle $\gamma(j)$ refers to a hitch angle $\gamma$ that cannot be overcome by the maximum steering input for a vehicle, when the vehicle is reversing, such as, for example, the steered front wheels 306 of the vehicle 302 being moved to a maximum steered angle $\delta$ at a maximum rate of steering angle change. The jackknife angle $\gamma(j)$ is a function of a maximum wheel angle for the steered wheel 306 of the vehicle 302, the wheel base W of the vehicle 302, the distance L between hitch point 308 and the rear axle 310 of the vehicle 302, and the length D between the hitch point 308 and the axle 312 of the trailer 304. When the hitch angle $\gamma$ for the vehicle 302 and the trailer 304 achieves or exceeds the jackknife angle $\gamma$ (j), the vehicle 302 must be pulled forward to reduce the hitch angle $\gamma$. Thus, for limiting the potential for a vehicle/trailer system attaining a jackknife angle, it is preferable to control the yaw angle of the trailer while keeping the hitch angle of the vehicle/trailer system relatively small.

Figure 7:
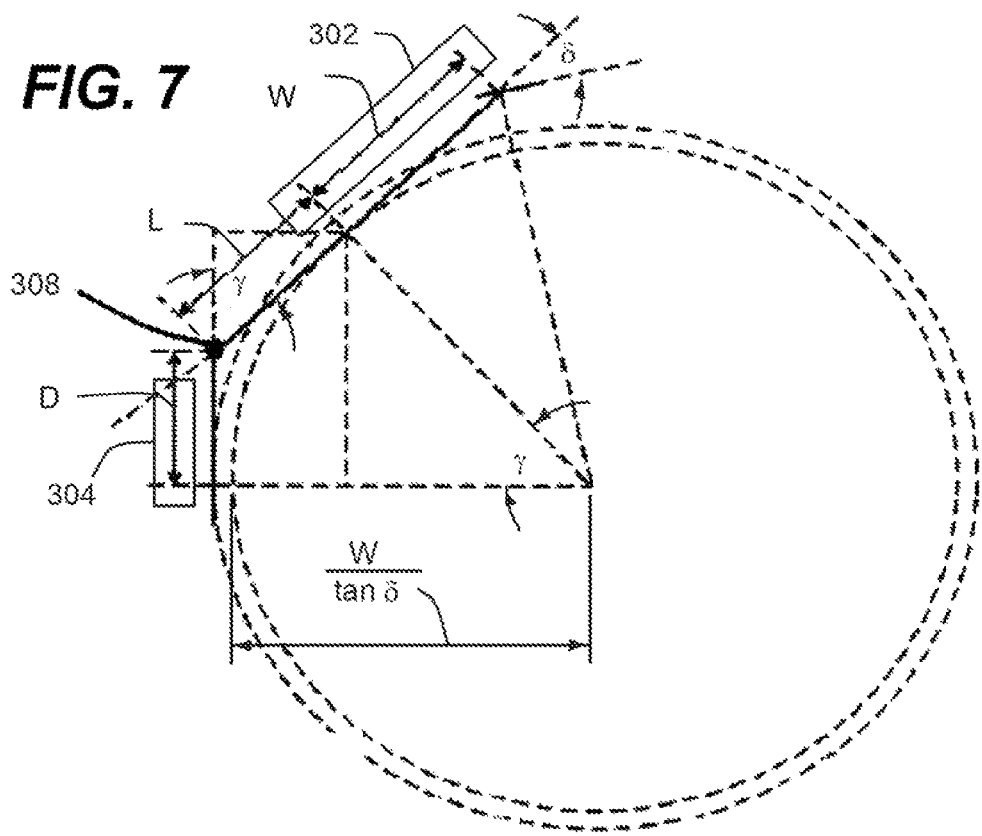
FIG. 7 is a diagrammatic view showing a relationship between hitch angle and steered angle as it relates to determining a jackknife angle for a vehicle/trailer system.

Referring to FIGS. 5 and 7, a steering angle limit for the steered front wheels 306 requires that the hitch angle $\gamma$ cannot exceed the jackknife angle $\gamma(j)$, which is also referred to as a critical hitch angle. Thus, under the limitation that the hitch angle $\gamma$ cannot exceed the jackknife angle $\gamma$ (j), the jackknife angle $\gamma$ (j) is the hitch angle $\gamma$ that maintains a circular motion for the vehicle/trailer system when the steered wheels 306 are at a maximum steering angle $\delta(max)$. The steering angle for circular motion with hitch angle is defined by the following equation.

$$\tan\delta_{max} = \frac{W\sin\gamma_{max}}{D + L\cos\gamma_{max}}$$

Solving the above equation for hitch angle allows jackknife angle $\gamma(j)$ to be determined. This solution, which is shown in the following equation, can be used in implementing trailer backup assist functionality in accordance with the inventive subject matter for monitoring hitch angle in relation to jackknife angle.

$$\cos\overline{\gamma} = \frac{-b \pm \sqrt{b^2 - 4ac}}{2a},$$

where,
  $a = L^2 \tan^2\delta(max) + W^2$;
  $b = 2$ LD $\tan^2\delta(max)$; and
  $c = D^2 \tan^2\delta(max) - W^2$.

In certain instances of backing a trailer, a jackknife enabling condition can arise based on current operating parameters of a vehicle in combination with a corresponding hitch angle. This condition can be indicated when one or more specified vehicle operating thresholds are met while a particular hitch angle is present. For example, although the particular hitch angle is not currently at the jackknife angle for the vehicle and attached trailer, certain vehicle operating parameters can lead to a rapid (e.g., uncontrolled) transition of the hitch angle to the jackknife angle for a current commanded trailer path curvature and/or can reduce an ability to steer the trailer away from the jackknife angle. One reason for a jackknife enabling condition is that trailer curvature control mechanisms (e.g., those in accordance with the inventive subject matter) generally calculate steering commands at an instantaneous point in time during backing of a trailer. However, these calculations will typically not account for lag in the steering control system of the vehicle (e.g., lag in a steering EPAS controller). Another reason for the jackknife enabling condition is that trailer curvature control mechanisms generally exhibit reduced steering sensitivity and/or effectiveness when the vehicle is at relatively high speeds and/or when undergoing relatively high acceleration.

Figure 8:
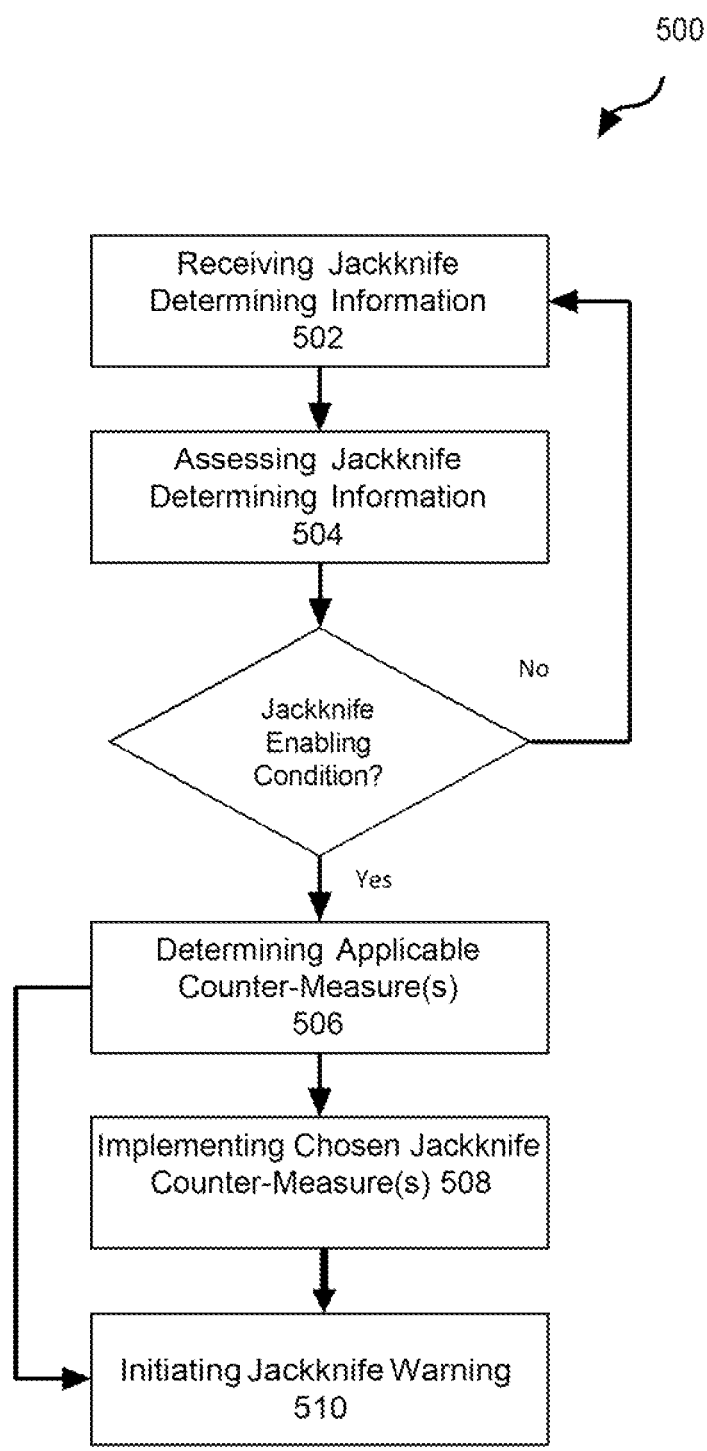
FIG. 8 shows a method for implementing jackknife countermeasures functionality in accordance with an embodiment of the inventive subject matter.

FIG. 8 shows a method 500 for implementing jackknife countermeasures functionality in accordance with an embodiment of the inventive subject matter for a vehicle and attached trailer. Trailer backup assist functionality in accordance with the inventive subject matter can include jackknife countermeasures functionality. Alternatively, jackknife countermeasures functionality in accordance with an embodiment of the inventive subject matter can be implemented separately from other aspects of trailer backup assist functionality.

The method 500 begins when operation 502 is performed for receiving jackknife determining information characterizing a jackknife enabling condition of the vehicle-trailer combination at a particular point in time (e.g., at the point in time when the jackknife determining information was sampled). Examples of the jackknife determining information includes, but are not limited to, information characterizing a hitch angle, information characterizing a vehicle accelerator pedal transient state, information characterizing a speed of the vehicle, information characterizing longitudinal acceleration of the vehicle, information characterizing a brake torque being applied by a brake system of the vehicle, information characterizing a powertrain torque being applied to driven wheels of the vehicle, and information characterizing the magnitude and rate of driver requested trailer curvature. The operation 502 for receiving jackknife determining information can be the first operation in a sampling process where jackknife determining information is sampled upon initiation of an instance of implementing jackknife countermeasures functionality. In this regard, jackknife determining information would be continually monitored such as, for example, by a electronic control unit (ECU) that carries out trailer backup assist (TBA) functionality. As discussed above in reference to FIG. 5, a kinematic model representation of the vehicle and the trailer can be used to determine a jackknife angle for the vehicle-trailer combination. However, the inventive subject matter is not unnecessarily limited to any specific approach for determining the jackknife angle.

After receiving the jackknife determining information, an operation 504 is performed for assessing the jackknife determining information for determining if the vehicle-trailer combination attained the jackknife enabling condition at the particular point in time. The objective of the operation 504 for assessing the jackknife determining information is determining if a jackknife enabling condition has been attained at the point in time defined by the jackknife determining information. If it is determined that a jackknife enabling condition is not present at the particular point in time, the method 500 returns to the operation 502 for receiving another instance of the jackknife determining information. If it is determined that a jackknife enabling condition is present at the particular point in time, an operation 506 is performed for determining an applicable counter-measure or counter-measures to implement. Accordingly, in some embodiments of the inventive subject matter, an applicable counter-measure will be selected dependent upon a parameter identified as being a key influencer of the jackknife enabling condition. However, in other embodiments, an applicable counter-measure will be selected as being most able to readily alleviate the jackknife enabling condition. In still other embodiment, a pre-defined counter-measure or pre-defined set of counter-measures may be the applicable counter-measure(s).

The objective of a counter-measure in the context of the inventive subject matter (i.e., a jackknife reduction counter-measure) is to alleviate a jackknife enabling condition. To this end, such a counter-measure can be configured to alleviate the jackknife enabling condition using a variety of different strategies. In a vehicle speed sensitive counter-measure strategy, actions taken for alleviating the jackknife enabling condition can include overriding and/or limiting driver requested trailer radius of curvature (e.g., being requested via a trailer backup steering input apparatus configured in accordance with the inventive subject matter) as a function of vehicle speed (e.g., via a look-up table correlating radius of curvature limits to vehicle speed as shown in FIG. 6). In a counter-measure strategy where trailer curvature requests are limited as a function of speed and driver curvature command transient rates, actions taken for alleviating the jackknife enabling condition can include rate limiting trailer curvature command transients as requested by a driver above a pre-defined vehicle speed whereas, under the pre-defined vehicle speed, the as-requested trailer curvature are not rate limited. In a torque limiting counter-measure strategy, actions taken for alleviating the jackknife enabling condition can include application of full available powertrain torque being inhibited when the jackknife enabling condition is present while the vehicle is above a pre-defined speed and application of full available powertrain torque being allowed when the vehicle speed is reduced below the pre-defined speed while in the torque inhibiting mode. As opposed to a fixed pre-defined speed, the torque limiting counter-measure strategy can utilize a speed threshold that is a function of hitch angle (i.e., speed threshold inversely proportional to hitch angle acuteness). In a driver accelerator pedal transient detection counter-measure strategy, actions taken for alleviating the jackknife enabling condition can include overriding and/or limiting driver requested trailer radius of curvature as a function of transient accelerator pedal requests (e.g., requested trailer radius of curvature limited when a large accelerator pedal transient is detected). In a hitch angle rate sensitive counter-measure strategy, actions taken for alleviating the jackknife enabling condition can include using hitch angle rate in a predefined or calculated mapping with current hitch angle position to limit driver requested trailer radius of curvature. Accordingly, in view of the disclosures made herein, a skilled person will appreciate that embodiments of the inventive subject matter are not unnecessarily limited to a counter-measure strategy of any particular configuration.

As disclosed above, implementation of trailer backup assist functionality in accordance with the inventive subject matter can utilize a kinematic model for determining steering control information, jackknife enabling conditions, and jackknife angle. Such a kinematic model has many parameters than can influence trailer curvature control effectiveness. Examples of these parameters include, but are not limited to, the vehicle wheelbase, understeer gradient gain, vehicle track width, maximum steer angle at the vehicle front wheels, minimum turning radius of vehicle, maximum steering rate able to be commanded by the steering system, hitch ball to trailer axle length, and vehicle rear axle to hitch ball length. Sensitivity analysis for a given kinematic model can be used to provide an understanding (e.g., sensitivity) of the relationships between such parameters, thereby providing information necessary for improving curvature control performance and for reducing the potential for jackknife enabling conditions. For example, through an understanding of the sensitivity of the parameters of a kinematic model, scaling factors can be used with speed dependent jackknife counter-measures to reduce jackknife potential (e.g., for special applications such as short wheelbase conditions).

Still referring to FIG. 8, after determining the applicable countermeasure(s), an operation 508 is performed for implementing the chosen jackknife countermeasure(s) and an operation 510 is performed for initiating a jackknife warning. As discussed above in regard to counter-measure strategies, implementing the jackknife counter-measure(s) can include commanding a speed controlling system of the vehicle to transition to an altered state of operation in which a speed of the vehicle is reduced, commanding the steering control system of the vehicle to transition to an altered state of operation in which a radius of a curvature of a path of the trailer is increased, command the steering control system of the vehicle to transition to an altered state of operation in which a decrease in the radius of the curvature of the path of the trailer is inhibited, commanding a brake control system of the vehicle to apply brake torque to reduce vehicle speed/inhibit vehicle acceleration, and/or commanding a powertrain control system of the vehicle to inhibit full available powertrain torque from being delivered to driven wheels of the vehicle until another jackknife enabling parameter (e.g., vehicle speed) is below a defined threshold. In certain embodiments of the inventive subject matter, the jackknife warning is provided to the driver using at least one vehicle control system through which the jackknife counter-measure is implemented. Speed reduction can be accomplished by any number of means such as, for example, limiting throttle inputs (e.g., via a terrain management feature) and/or transitioning a transmission to a reverse low gear if the vehicle is equipped with a multi-range reverse gear transmission. Examples of such system-specific warning approach include, but are not limited to, providing a warning through an accelerator pedal of the vehicle (e.g., via haptic feedback) if the counter-measure includes limiting speed of the vehicle and/or providing a warning through an input element (e.g., knob) of a trailer backup steering input apparatus of the vehicle (e.g., via haptic feedback if the counter-measure includes limiting driver requested trailer radius of curvature), through haptic seat vibration warning, through a visual warning (e.g., through a visual display apparatus of the towing vehicle) and/or through audible warnings (e.g., through an audio output apparatus of the towing vehicle), or the like. One embodiment of utilizing warnings relating to vehicle speed as it relates to onset or presence of a jackknife enabling condition includes implementation of a dual stage warning. For example, when a backing speed of the vehicle increases sufficiently for causing a speed of the vehicle to reach a lower (i.e., first) speed threshold during backing of the trailer, a driver of the vehicle would be provided with a first warning indication (e.g., via haptic, audible, and/or visual means as implemented by the trailer backup assist system) for informing the driver that there is the need to reduce the speed of the vehicle to alleviate or preclude the jackknife enabling condition. If the driver does not correspondingly respond by causing a speed of the vehicle to be reduced (or not to further increase) and the vehicle continues to gain speed such that it passes a higher (i.e., a second) speed threshold, the driver of the vehicle would be provided with a second warning indication (e.g., a more severe haptic, audible, and/or visual means as implemented by the trailer backup assist system) for informing the driver that there is an immediate need to reduce the speed of the vehicle to alleviate or preclude the jackknife enabling condition. The first and/or the second speed indication warnings can be implemented in conjunction with a respective speed limiting counter-measure or measures (e.g., the trailer backup assist system causing activation of a brake system of the vehicle and/or reducing a throttle position of the vehicle).

Referring now to instructions processable by a data processing device, it will be understood from the disclosures made herein that methods, processes and/or operations adapted for carrying out trailer backup assist functionality as disclosed herein are tangibly embodied by non-transitory computer readable medium having instructions thereon that are configured for carrying out such functionality. The instructions are tangibly embodied for carrying out the method 200 disclosed and discussed above and can be further configured for limiting the potential for a jackknife condition such as, for example, by monitoring jackknife angle through use of the equations discussed in reference to FIGS. 5 and 7 and/or by implementing jackknife countermeasures functionality discussed above in reference to FIG. 8. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the inventive subject matter include a compact disk, a hard drive, RAM or other type of storage apparatus that has imaged thereon a computer program (i.e., instructions) configured for carrying out trailer backup assist functionality in accordance with the inventive subject matter.

In a preferred embodiment of the inventive subject matter, a trailer back-up assist control module (e.g., the trailer back-up assist control module 120 discussed above in reference to FIG. 1) comprises such a data processing device, such a non-transitory computer readable medium, and such instructions on the computer readable medium for carrying out trailer backup assist functionality (e.g., in accordance with the method 200 discussed above in reference to FIG. 2 and/or the method 500 discussed above in reference to FIG. 8). To this end, the trailer back-up assist control module can comprise various signal interfaces for receiving and outputting signals. For example, a jackknife enabling condition detector can include a device providing hitch angle information and hitch angle calculating logic of the trailer back-up assist control module. A trailer back-up assist control module in the context of the inventive subject matter can be any control module of an electronic control system that provides for trailer back-up assist control functionality in accordance with the inventive subject matter. Furthermore, it is disclosed herein that such a control functionality can be implemented within a standalone control module (physically and logically) or can be implemented logically within two or more separate but interconnected control modules (e.g., of an electronic control system of a vehicle) In one example, trailer back-up assist control module in accordance with the inventive subject matter is implemented within a standalone controller unit that provides only trailer backup assist functionality. In another example, trailer backup assist functionality in accordance with the inventive subject matter is implemented within a standalone controller unit of an electronic control system of a vehicle that provides trailer backup assist functionality as well as one or more other types of system control functionality of a vehicle (e.g., anti-lock brake system functionality, steering power assist functionality, etc). In still another example, trailer backup assist functionality in accordance with the inventive subject matter is implemented logically in a distributed manner whereby a plurality of control units, control modules, computers, or the like (e.g., an electronic control system) jointly carry out operations for providing such trailer backup assist functionality.

In the preceding detailed description, reference has been made to the accompanying drawings that form a part hereof, and in which are shown by way of illustration specific embodiments in which the inventive subject matter may be practiced. These embodiments, and certain variants thereof, have been described in sufficient detail to enable those skilled in the art to practice embodiments of the inventive subject matter. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for preventing a jackknife condition between a vehicle and a trailer towed by the vehicle, the vehicle having a trailer backup assist system and a trailer backup steering input apparatus associated therewith for inputting a driver requested curvature command to the trailer backup assist system, the method comprising the steps of:
    assessing jackknife information and a jackknife condition threshold during backing of the trailer to detect an imminent jackknife condition; and
    implementing a jackknife counter-measure in response to detection of the imminent jackknife condition during backing of the trailer by the vehicle, wherein implementing the jackknife counter-measure further comprises restricting the trailer backup steering input apparatus.

2. The method of claim 1, wherein the steering input apparatus is a rotational control input device having an at-rest position between opposing rotational ranges of motion and the step of restricting the trailer backup steering input apparatus further comprises:
    the trailer backup assist system activating a wanting at the rotational control input device as an indication that the trailer backup assist system has restricted a commanded curvature of a path of travel of the trader.

3. The method of claim 2 wherein the step of activating a warning further comprises initiating a tactile warning at the rotational control input device.

4. The method of claim 2 wherein the step of activating a warning further comprises initiating an illuminated warning.

5. The method of claim 2 wherein the step of activating a warning further comprises initiating an audible signal.

6. The method of claim 1 wherein the step of restricting the trailer backup steering input apparatus further comprises limiting a transient of the driver requested curvature command.

7. The method of claim 6 wherein the step of restricting the trailer backup steering input apparatus further comprises limiting a rate that curvature command transients change as they are sent from the trailer backup steering input apparatus to the trailer backup assist system.

8. The method of claim 7 wherein the step of limiting the rate that trailer curvature command transients change as they are sent to the trailer backup assist system is in response to a vehicle speed that exceeds a predetermined threshold.

9. The method of claim 7 wherein the step of limiting the rate that trailer curvature command transients change as they are sent to the trailer backup assist system is in response to the trailer backup assist system detecting an accelerator pedal transient that exceeds a predetermined threshold.

10. The method of claim 6 wherein the step of limiting the trailer backup steering input apparatus further comprises limiting a magnitude that curvature command transients change as they are sent from the trailer backup steering input apparatus to the trailer backup assist system.

11. The method as claimed in claim 10 wherein the step of limiting the magnitude that trailer curvature command transients change as they are sent to the trailer backup assist system is in response to a vehicle speed that exceeds a predetermined threshold.

12. The method as claimed in claim 10 wherein the step of limiting the magnitude that trailer curvature command transients change as they are sent to the trailer backup assist system is in response to the trailer backup assist system detecting an accelerator pedal transient that exceeds a predetermined threshold.

13. The method as claimed in claim 6 wherein the step of limiting the trailer backup steering input apparatus further comprises limiting a rate and a magnitude that curvature command transients change as they are sent from the trailer backup steering input apparatus to the trailer backup assist system.

14. The method as claimed in claim 13 wherein the step of limiting the rate and the magnitude that trailer curvature command transients change as they are sent to the trailer backup assist system is in response to a vehicle speed that exceeds a predetermined threshold.

15. The method as claimed in claim 13 wherein the step of limiting the rate and the magnitude that trailer curvature command transients change as they are sent to the trailer backup assist system is in response to the trailer backup assist system detecting an accelerator pedal transient that exceeds a predetermined threshold.

16. A trailer backup assist system for a vehicle capable of towing a trailer, comprising:
a trailer angle detection apparatus configured for generating a signal as a function of an angle between the vehicle and the trailer;
a trailer backup steering input apparatus for commanding a trailer curvature; and
a jackknife counter-measure controller configured for restricting the trailer backup steering input apparatus and altering at least one vehicle operating parameter when a jackknife condition is imminent during backing of the trailer by the vehicle.

17. The system of claim 16 wherein:
the jackknife counter-measure controller initiates a jackknife warning to a driver of the vehicle when a jackknife condition is imminent; and
the jackknife wanting is provided to the driver using the trailer backup steering input apparatus.

18. The system of claim 16 wherein the jackknife warning is a tactile warning.

19. The system of claim 16 wherein the jackknife warning is a visual warning.

20. The system of claim 16 wherein the jackknife warning is an audible warning.

21. The system of claim 16 wherein restricting the trailer backup steering input apparatus further comprises the jackknife counter-measure controller limiting a rate that curvature command inputs can change and be implemented by the trailer backup steering input apparatus to the trailer backup assist system.

22. The system of claim 21 wherein the trailer backup steering input apparatus further comprises a rotatable control element and the rate that curvature commands can change and be implemented by the trailer backup system is dependent upon a rate of movement of the rotatable control element wherein the jackknife counter-measure controller causes an increase in tension of the rotatable control element.

23. The system of claim 16 wherein restricting the trailer backup steering input apparatus further comprises the jackknife counter-measure controller limiting a magnitude that curvature command inputs can change and be implemented by the trailer backup assist system.

24. The system of claim 23 wherein the trailer backup steering input apparatus further comprises a rotatable control element and the magnitude of curvature command inputs can change and be implemented by the trailer backup assist system is dependent upon a rate of movement of the rotatable control element wherein the jackknife counter-measure controller causes an increase in tension of the rotatable control element.

25. The system of claim 16 wherein restricting the trailer backup steering input apparatus further comprises the jackknife counter-measure controller limiting a rate and a magnitude that the curvature command inputs can change and be implemented by the trailer backup assist system.

26. The system of claim 25 wherein the trailer backup steering input apparatus further comprises a rotatable control element and the rate and magnitude that curvature commands can change is dependent upon a rate and magnitude of movement of the rotatable control element and wherein the jackknife counter-measure controller causes an increase in tension of the rotatable control element.

27. A method for preventing a jackknife condition between a vehicle and a trailer towed by the vehicle, the vehicle having a trailer backup assist system and a trailer backup steering input apparatus associated therewith, the method comprising the steps of:
receiving a trailer curvature command from the trailer backup steering input apparatus;
assessing jackknife determining information for a vehicle and a trailer towably to the vehicle; and
implementing a jackknife counter-measure in response to the jackknife determining information indicating that a jackknife condition is imminent at a particular point in time during backing of the trailer by the vehicle, wherein implementing the jackknife counter-measure includes restricting the trailer backup steering input apparatus such that a decrease in a radius of curvature of the path of trailer is inhibited.

28. The method of claim 27 further comprising the step of initiating a jackknife warning to a driver of the vehicle in response to the jackknife determining information indicating that a jackknife condition is imminent.

29. The method of claim 28 wherein the step of initiating the jackknife warning further comprises initiating the jackknife warning using the trailer backup steering input apparatus.

30. The method of claim 29 wherein the step of initiating the jackknife warning further comprises activating a tactile warning at the trailer backup steering input apparatus.

31. The method of claim 28 wherein the step of initiating the jackknife warning further comprises activating an audible warning.

32. The method of claim 28 wherein the step of initiating the jackknife warning further comprises activating a visual warning.

33. The method of claim 27 wherein the trailer backup steering input apparatus further comprises a rotatable control element and restricting the trailer backup steering input apparatus further comprises increasing a tension of the rotatable control element to limit a rate that trailer curvature commands can change and be implemented by the trailer backup assist system.

34. The method of claim 27 wherein the trailer backup steering input apparatus thriller comprises a rotatable control element and restricting the trailer backup steering input apparatus further comprises increasing a tension of the rotatable control element to limit a magnitude that trailer curvature commands can change and be implemented by the trailer backup assist system.

35. The method of claim 27 wherein the trailer backup steering input apparatus further comprises a rotatable control element and restricting the trailer backup steering input apparatus further comprises increasing a tension of the rotatable control element to limit a rate and a magnitude that trailer curvature commands can change and be implemented by the trailer backup assist system.

* * * * *